(12) United States Patent
Lin et al.

(10) Patent No.: US 8,243,846 B2
(45) Date of Patent: Aug. 14, 2012

(54) TRANSMISSION DEVICE WITH ENHANCED SIGNALS

(75) Inventors: Wen-Chi Lin, Yilan County (TW);
Che-Li Lin, Taipei (TW)

(73) Assignee: NOVATEK Microelectronics Corp.,
Hsinchu Science Park, Hsin-Chu (TW)

( * ) Notice: Subject to any disclaimer, the term of this patent is extended or adjusted under 35 U.S.C. 154(b) by 685 days.

(21) Appl. No.: 12/412,323

(22) Filed: Mar. 26, 2009

(65) Prior Publication Data
US 2010/0067611 A1 Mar. 18, 2010

(30) Foreign Application Priority Data

Sep. 16, 2008 (TW) ................................ 97135440 A

(51) Int. Cl.
*H04L 27/00* (2006.01)
(52) U.S. Cl. ..................... 375/295; 375/257; 341/155
(58) Field of Classification Search .................. 375/286, 375/295, 256–259; 341/155, 160–163
See application file for complete search history.

(56) References Cited

U.S. PATENT DOCUMENTS

| 4,393,370 A | * | 7/1983 | Hareyama ..................... 341/136 |
| 6,177,900 B1 | * | 1/2001 | Nakaigawa ................... 341/160 |
| 6,212,230 B1 | * | 4/2001 | Rybicki et al. ................ 375/239 |
| 6,603,417 B2 | * | 8/2003 | Greig ............................. 341/136 |
| 6,624,775 B1 | * | 9/2003 | Lai et al. ....................... 341/144 |
| 7,167,527 B1 | * | 1/2007 | Park et al. ..................... 375/295 |
| 2003/0001765 A1 | * | 1/2003 | Bright ........................... 341/145 |
| 2008/0001644 A1 | * | 1/2008 | Abel et al. ..................... 327/231 |

FOREIGN PATENT DOCUMENTS
CN 101174392 A 5/2008
* cited by examiner

*Primary Examiner* — Emmanuel Bayard
(74) *Attorney, Agent, or Firm* — Winston Hsu; Scott Margo

(57) ABSTRACT

A transmission device includes a first encoder, a plurality of current sources, a switch module, a second encoder, and a plurality of current enhanced circuits. The first encoder converts an input signal to a first control signal. The switch module is coupled between the plurality of current sources and a plurality of signal lines for controlling the connection of the current sources and the signal lines according to the first control signal to generate a current signal. The second encoder generates a second control signal according to the first control signal or the input signal. The plurality of current enhanced circuits is coupled to the plurality of current sources respectively. The plurality of current enhanced circuits provides an extra current in a predetermined duration to enhance the current signal.

17 Claims, 19 Drawing Sheets

| D0 | SWp | SWBp | SWn | SWBn |
|----|-----|------|-----|------|
| 1  | 1   | 0    | 0   | 1    |
| 0  | 0   | 1    | 1   | 0    |

FIG. 6 PRIOR ART

| D3 | D2 | D1 | D0 | P1 | P2 | P3 | P4 | P5 | P6 | P7 | P8 | N1 | N2 | N3 | N4 | N5 | N6 | N7 | N8 |
|---|---|---|---|---|---|---|---|---|---|---|---|---|---|---|---|---|---|---|---|
| 0 | 1 | 1 | 1 | 0 | 1 | 0 | 0 | 0 | 0 | 0 | 1 | 1 | 0 | 0 | 0 | 0 | 0 | 1 | 0 |
| 0 | 0 | 1 | 1 | 1 | 0 | 0 | 0 | 0 | 0 | 0 | 1 | 1 | 1 | 0 | 0 | 0 | 0 | 1 | 0 |
| 0 | 1 | 0 | 0 | 0 | 1 | 0 | 0 | 0 | 0 | 0 | 0 | 0 | 0 | 0 | 0 | 0 | 0 | 0 | 1 |
| 0 | 0 | 0 | 0 | 1 | 0 | 0 | 0 | 0 | 0 | 1 | 0 | 1 | 1 | 0 | 0 | 0 | 0 | 0 | 1 |
| 0 | 1 | 1 | 0 | 0 | 0 | 0 | 1 | 1 | 1 | 0 | 0 | 0 | 0 | 1 | 1 | 1 | 0 | 0 | 0 |
| 0 | 0 | 0 | 1 | 0 | 0 | 1 | 1 | 1 | 1 | 0 | 0 | 0 | 0 | 0 | 0 | 1 | 1 | 0 | 0 |
| 0 | 1 | 0 | 1 | 0 | 0 | 1 | 0 | 1 | 1 | 0 | 0 | 0 | 0 | 1 | 1 | 1 | 0 | 0 | 0 |
| 0 | 0 | 0 | 0 | 0 | 0 | 0 | 1 | 0 | 0 | 1 | 0 | 0 | 0 | 1 | 0 | 0 | 1 | 0 | 0 |
| 1 | 1 | 0 | 0 | 1 | 0 | 0 | 0 | 0 | 0 | 1 | 0 | 0 | 0 | 0 | 1 | 0 | 0 | 1 | 0 |
| 1 | 0 | 1 | 1 | 0 | 0 | 1 | 0 | 0 | 0 | 0 | 1 | 0 | 0 | 1 | 0 | 1 | 0 | 0 | 0 |
| 1 | 0 | 1 | 1 | 0 | 1 | 0 | 1 | 0 | 0 | 0 | 0 | 0 | 1 | 0 | 0 | 0 | 0 | 0 | 0 |
| 1 | 0 | 0 | 0 | 0 | 0 | 0 | 0 | 1 | 1 | 0 | 1 | 0 | 0 | 0 | 1 | 1 | 0 | 0 | 1 |
| 1 | 1 | 1 | 1 | 1 | 1 | 0 | 0 | 0 | 0 | 0 | 0 | 0 | 0 | 1 | 0 | 0 | 0 | 1 | 1 |
| 1 | 1 | 0 | 0 | 0 | 0 | 0 | 0 | 0 | 1 | 1 | 0 | 0 | 0 | 0 | 1 | 0 | 0 | 1 | 0 |
| 1 | 1 | 1 | 1 | 0 | 0 | 1 | 1 | 0 | 0 | 1 | 0 | 1 | 0 | 0 | 0 | 0 | 1 | 0 | 0 |

FIG. 8 PRIOR ART

| Duration=N | Duration=N+1 | | | | | |
|---|---|---|---|---|---|---|
| D0 | D0 | SWp | SWBp | SWn | SWBn | eeSW |
| 1 | 1 | 1 | 0 | 0 | 1 | 0 |
| 0 | 0 | 0 | 1 | 1 | 0 | 0 |
| 1 | 0 | 0 | 1 | 1 | 0 | 1(t) |
| 0 | 1 | 1 | 0 | 0 | 1 | 1(t) |

FIG. 12

| Duration =N | Duration =N+1 | Duration =N+1 ||||||||
|---|---|---|---|---|---|---|---|---|---|
| | | DATA1N$_x$ | DATA1P$_x$ | DATA0N$_x$ | DATA0P$_x$ | eeSW$_p$3l | eeSW$_p$1l | eeSW$_n$1l | eeSW$_n$3l |
| 3l | 3l | P5(N)&P5(N+1) | P6(N)&P6(N+1) | P7(N)&P7(N+1) | P8(N)&P8(N+1) | 0 | – | – | – |
| 1 | 3l | P1(N)&P5(N+1) | P2(N)&P6(N+1) | P3(N)&P7(N+1) | P4(N)&P8(N+1) | 1(t) | – | – | – |
| -1 | 3l | N1(N)&P5(N+1) | N2(N)&P6(N+1) | N3(N)&P7(N+1) | N4(N)&P8(N+1) | 1(t) | – | – | – |
| -3l | 3l | N5(N)&P5(N+1) | N6(N)&P6(N+1) | N7(N)&P7(N+1) | N8(N)&P8(N+1) | 1(t) | – | – | – |
| 3l | 1 | P5(N)&P1(N+1) | P6(N)&P2(N+1) | P7(N)&P3(N+1) | P8(N)&P4(N+1) | – | 0 | – | – |
| 1 | 1 | P1(N)&P1(N+1) | P2(N)&P2(N+1) | P3(N)&P3(N+1) | P4(N)&P4(N+1) | – | 0 | – | – |
| -1 | 1 | N1(N)&P1(N+1) | N2(N)&P2(N+1) | N3(N)&P3(N+1) | N4(N)&P4(N+1) | – | 1(t) | – | – |
| -3l | 1 | N5(N)&P1(N+1) | N6(N)&P2(N+1) | N7(N)&P3(N+1) | N8(N)&P4(N+1) | – | 1(t) | – | – |
| 3l | -1 | P5(N)&N1(N+1) | P6(N)&N2(N+1) | P7(N)&N3(N+1) | P8(N)&N4(N+1) | – | – | 1(t) | – |
| 1 | -1 | P1(N)&N1(N+1) | P2(N)&N2(N+1) | P3(N)&N3(N+1) | P4(N)&N4(N+1) | – | – | 1(t) | – |
| -1 | -1 | N1(N)&N1(N+1) | N2(N)&N2(N+1) | N3(N)&N3(N+1) | N4(N)&N4(N+1) | – | – | 0 | – |
| -3l | -1 | N5(N)&N1(N+1) | N6(N)&N2(N+1) | N7(N)&N3(N+1) | N8(N)&N4(N+1) | – | – | 0 | – |
| 3l | -3l | P5(N)&N5(N+1) | P6(N)&N6(N+1) | P7(N)&N7(N+1) | P8(N)&N8(N+1) | – | – | – | 1(t) |
| 1 | -3l | P1(N)&N5(N+1) | P2(N)&N6(N+1) | P3(N)&N7(N+1) | P4(N)&N8(N+1) | – | – | – | 1(t) |
| -1 | -3l | N1(N)&N5(N+1) | N2(N)&N6(N+1) | N3(N)&N7(N+1) | N4(N)&N8(N+1) | – | – | – | 1(t) |
| -3l | -3l | N5(N)&N5(N+1) | N6(N)&N6(N+1) | N7(N)&N7(N+1) | N8(N)&N8(N+1) | – | – | – | 0 |

FIG. 15

| Duration =N | Duration =N+1 | DATA1Nx | DATA1Px | DATA0Nx | DATA0Px | eeSWp3l_1 | eeSWp3l_2 | eeSWp3l_3 | eeSWp1l_1 | eeSWp1l_2 | eeSWp1l_3 | eeSWn3l_1 | eeSWn3l_2 | eeSWn3l_3 | eeSWn1l_1 | eeSWn1l_2 | eeSWn1l_3 |
|---|---|---|---|---|---|---|---|---|---|---|---|---|---|---|---|---|---|
| 3l | 3l | P5(N)&P5(N+1) | P6(N)&P6(N+1) | P7(N)&P7(N+1) | P8(N)&P8(N+1) | 0 | 0 | 0 | - | - | - | - | - | - | - | - | - |
| 1 | 3l | P1(N)&P5(N+1) | P2(N)&P6(N+1) | P3(N)&P7(N+1) | P4(N)&P8(N+1) | 1(t) | 0 | 0 | - | - | - | - | - | - | - | - | - |
| -1 | 3l | N1(N)&P5(N+1) | N2(N)&P6(N+1) | N3(N)&P7(N+1) | N4(N)&P8(N+1) | 1(t) | 1(t) | 0 | - | - | - | - | - | - | - | - | - |
| -3l | 3l | N5(N)&P5(N+1) | N6(N)&P6(N+1) | N7(N)&P7(N+1) | N8(N)&P8(N+1) | 1(t) | 1(t) | 1(t) | - | - | - | - | - | - | - | - | - |
| 3l | 1 | P5(N)&P1(N+1) | P6(N)&P2(N+1) | P7(N)&P3(N+1) | P8(N)&P4(N+1) | - | - | - | 0 | 0 | 1(t) | - | - | - | - | - | - |
| 1 | 1 | P1(N)&P1(N+1) | P2(N)&P2(N+1) | P3(N)&P3(N+1) | P4(N)&P4(N+1) | - | - | - | 0 | 0 | 0 | - | - | - | - | - | - |
| -1 | 1 | N1(N)&P1(N+1) | N2(N)&P2(N+1) | N3(N)&P3(N+1) | N4(N)&P4(N+1) | - | - | - | 1(t) | 0 | 0 | - | - | - | - | - | - |
| -3l | 1 | N5(N)&P1(N+1) | N6(N)&P2(N+1) | N7(N)&P3(N+1) | N8(N)&P4(N+1) | - | - | - | 1(t) | 1(t) | 0 | - | - | - | - | - | - |
| 3l | -1 | P5(N)&N1(N+1) | P6(N)&N2(N+1) | P7(N)&N3(N+1) | P8(N)&N4(N+1) | - | - | - | - | - | - | 1(t) | 1(t) | 0 | - | - | - |
| 1 | -1 | P1(N)&N1(N+1) | P2(N)&N2(N+1) | P3(N)&N3(N+1) | P4(N)&N4(N+1) | - | - | - | - | - | - | 1(t) | 0 | 0 | - | - | - |
| -1 | -1 | N1(N)&N1(N+1) | N2(N)&N2(N+1) | N3(N)&N3(N+1) | N4(N)&N4(N+1) | - | - | - | - | - | - | 0 | 0 | 0 | - | - | - |
| -3l | -1 | N5(N)&N1(N+1) | N6(N)&N2(N+1) | N7(N)&N3(N+1) | N8(N)&N4(N+1) | - | - | - | - | - | - | 0 | 0 | 1(t) | - | - | - |
| 3l | -3l | P5(N)&N5(N+1) | P6(N)&N6(N+1) | P7(N)&N7(N+1) | P8(N)&N8(N+1) | - | - | - | - | - | - | - | - | - | 1(t) | 1(t) | 1(t) |
| 1 | -3l | P1(N)&N5(N+1) | P2(N)&N6(N+1) | P3(N)&N7(N+1) | P4(N)&N8(N+1) | - | - | - | - | - | - | - | - | - | 1(t) | 1(t) | 0 |
| -1 | -3l | N1(N)&N5(N+1) | N2(N)&N6(N+1) | N3(N)&N7(N+1) | N4(N)&N8(N+1) | - | - | - | - | - | - | - | - | - | 1(t) | 0 | 0 |
| -3l | -3l | N5(N)&N5(N+1) | N6(N)&N6(N+1) | N7(N)&N7(N+1) | N8(N)&N8(N+1) | - | - | - | - | - | - | - | - | - | 0 | 0 | 0 |

FIG. 18

TRANSMISSION DEVICE WITH ENHANCED SIGNALS

BACKGROUND OF THE INVENTION

1. Field of the Invention

The present invention relates to a transmission device, and more particularly, to a transmission devices with enhanced signals.

2. Description of the Prior Art

Many flat panel display (FDP) devices nowadays use the two-level signal transmission interface, such as RSDS, mini-LVDS etc. The requirement of the data and the clock rate increases with the higher resolution, various color depth, and higher frame rate. The multi-level signal transmission can transmit more information than the two-level signal transmission in one clock cycle, so the number of signal lines and the clock rate can be decreased in the multi-level signal transmission.

Please refer to FIG. 1 to FIG. 3. There are two architectures that the FDP device transmits the display data from the timing controller (Tcon) to the source driver, the bus signaling type architecture and the dedicated signaling type architecture. FIG. 1 illustrates the bus signaling type architecture of N source drivers. The source drivers CD1 to CD(N) share m signal lines which are coupled to all source drivers from the timing controller. FIG. 2 illustrates the dedicated signaling type architecture of N source drivers. Each source driver has n dedicated signal lines coupled to the predetermined source driver respectively from the timing controller. FIG. 3 is a schematic diagram of a connection of a timing controller and a source driver. For example, ten source drivers (N=10) use the dedicated signaling type architecture, and each source driver uses two pairs of differential signal lines (n=4), CDi_0P, CDi_0N, CDi_1P and CDi_1N respectively, where i is from 1 to N. Each pair of the differential signals has a terminal circuit T. The terminal circuit T is installed outside the source driver. The terminal circuits T of the transmission pair is coupled to the common mode voltage (CDi_VCOM).

Please refer to FIG. 4. FIG. 4 is a system block diagram of a transmission device according to the prior art. The transmission device 10 includes an encoder 11 and a transmitter 13. The transmitter 13 includes a current source module 14 and a switch module 15. The encoder 11 converts a display signal to a control signal. The switch module 15 controls the value and the direction of the current outputted from the current source module 14 according to the control signal so as to generate a current signal.

Please refer to FIG. 5 and FIG. 6, FIG. 5 is a circuitry of the two-level transmission device according to the prior art. FIG. 6 is a truth table of the encoder. The transmission device 20 includes an encoder 21 and a transmitter 23. The encoder 21 converts a displaying signal D0 to a control signal (SWn/SWp/SWBn/SWBp). The transmitter 23 includes a plurality of the current sources 24 and a switch module 25. The current source 24 can generate the positive current +I and the negative current −I. As the truth table shown in FIG. 6, the switch module 25 includes switches SWn, SWp, SWBn and SWBp. The switches SWn, SWp, SWBn and SWBp are controlled by the control signal. The control signal represents logic"1" when the switch is turned on. The control signal represents logic"0" when the switch is turned off. The switches SWp and SWBn are turned on when the displaying signal D0 represents logic"1". Thus, the current flowing to the signal line DATAP is +I and the current flowing to the signal line DATAN is −I. The switches SWBp and SWn are turned on when the display signal D0 represents logic"0". Thus, the current flowing to the signal line DATAP is −I and the current flowing to the signal line DATAN is +I.

Please refer to FIG. 7 and FIG. 8. FIG. 7 is a circuitry of the four-level transmission device according to the prior art. FIG. 8 is a truth table of the encoder. The transmission device 30 includes an encoder 31 and a transmitter 33. The encoder 31 converts a display signal D0/D1/D2/D3 into the control signal (P1~P8/N1~N8). The transmitter 33 includes a plurality of current sources 24 and a gate module 35. The plurality of the current sources 24 can provide the positive current +I, +3I and the negative current −I, −3I. The switch module 35 includes switches P1~P8 and N1~N8. As the truth table shown in FIG. 8, the switches P1~P8 and N1~N8 are controlled by the control signal. The Switches P1, P7, N2, and N8 are turned on when the display signal D0/D1/D2/D3 is 0/0/0/0. The current of signal lines DATA1Nx is +I. The current of signal lines DATA1Px is −I. The current of signal lines DATA0Nx is +3I. The current of signal lines DATA0PX is −3I.

Please refer to FIG. 9. FIG. 9 is a schematic diagram of a display device. The signal outputted from the transistor TX will go through a series of channels before being received by the receiver RX. However, the condition of the channel varies with the size of the panel. The channel between the transistor TX and the receiver includes TX pad, Package Wire, Package Lead, CB PCB Trace, Connector, FPC, Bonding, SB PCB Trace, Golden Finger, COF Trace and RX pad. The channel includes many kinds of different transmission media. Therefore, channel effects include the impedance mismatch, the signal coupling, and the signal loss.

In conclusion, with the size increase of FDP, the trace of PCB and the number of connecters may increase as well, so the channel effects become more serious. The increase of the clock skew between the data and the clock cycle as well as the distortion of the data and the clock cycle themselves, both will cause the serious signal loss and decrease the precision of the signal receiving capability of the receiver. Thus, the more complicated circuit is required for receiving and reading the signal correctly.

SUMMARY OF THE INVENTION

According to an embodiment of the present invention, a signal enhanced transmission device comprises a first encoder, a plurality of current sources, a plurality of signal lines, a switch module, a second encoder, and a plurality of current enhanced circuits. The first encoder converts an input signal to a first control signal. The plurality of signal lines transmits a current signal. The switch module is coupled between the plurality of current sources and the plurality of signal lines, for controlling connection between the plurality of current sources and the plurality of signal lines according to the first control signal to determine the value of the current signal. The second encoder generates a second control signal according to the first control signal or the input signal. The plurality of current enhanced circuits is coupled to the plurality of current sources respectively, for providing an extra current according to the second control signal to change the value of the current signal.

According to another embodiment of the present invention, a signal enhanced transmission device comprises a first encoder, a plurality of current sources, a plurality of signal lines, a switch module, and a plurality of current enhanced circuits. The first encoder converts an input signal to a first control signal. The plurality of signal lines transmits a current signal. The switch module is coupled between the plurality of current sources and the plurality of signal lines, for controlling connection between the plurality of current sources and the plurality of signal lines according to the first control signal to determine the value of the current signal. The plurality of current enhanced circuits is coupled to the plurality of current sources respectively, for providing an extra current when the current signal changes to increase a variance of the current signal.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 6 is a truth table of the encoder.

FIG. 8 is a truth table of the encoder.

FIG. 12 is a truth table of the first encoder and the second encoder.

FIG. 15 is a truth table of the first encoder and the second encoder.

FIG. 18 is a truth table of the first encoder and second encoder.

DETAILED DESCRIPTION

Figure 1:
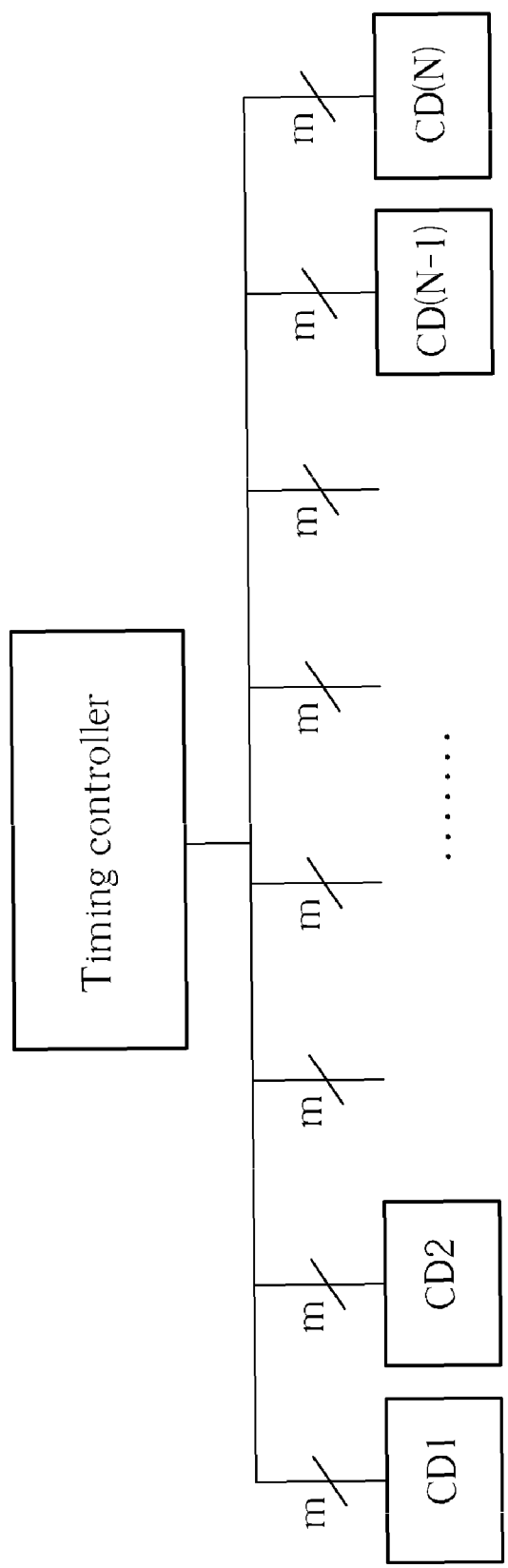
FIG. 1 is a schematic diagram of the bus signaling type architecture of N source drivers.
Figure 2:
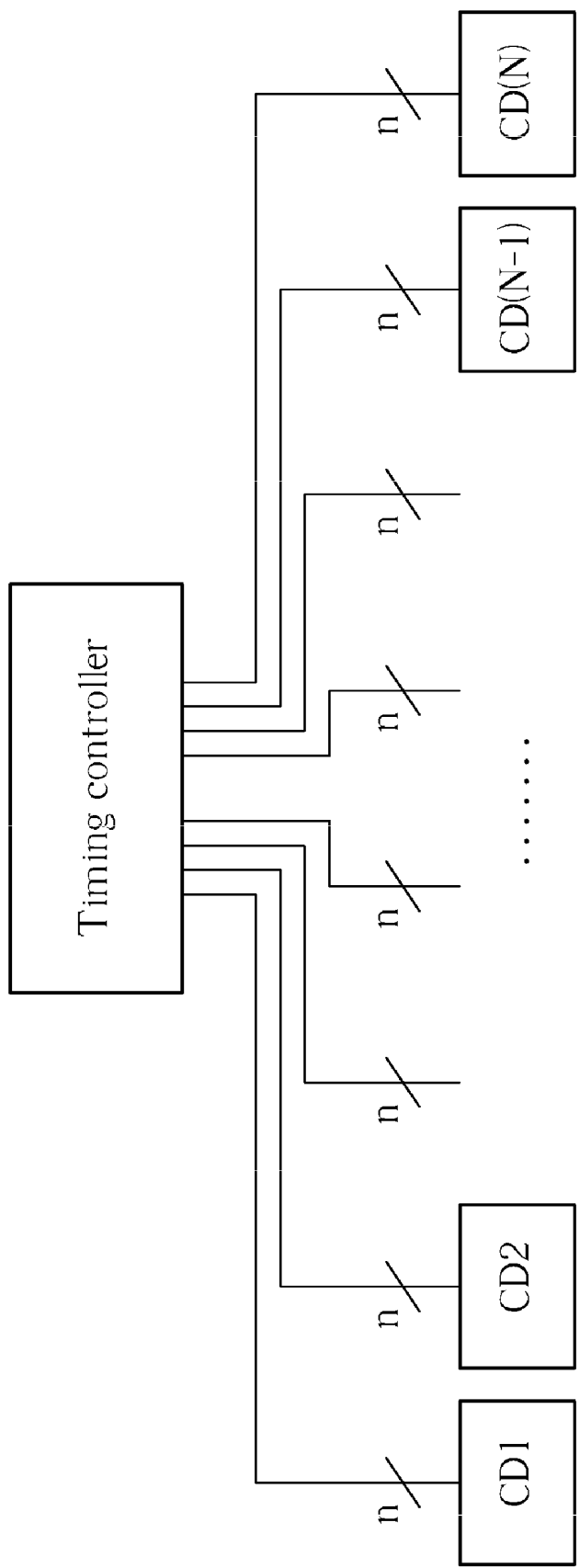
FIG. 2 is a schematic diagram of the dedicated signaling type of N source drivers
Figure 3:
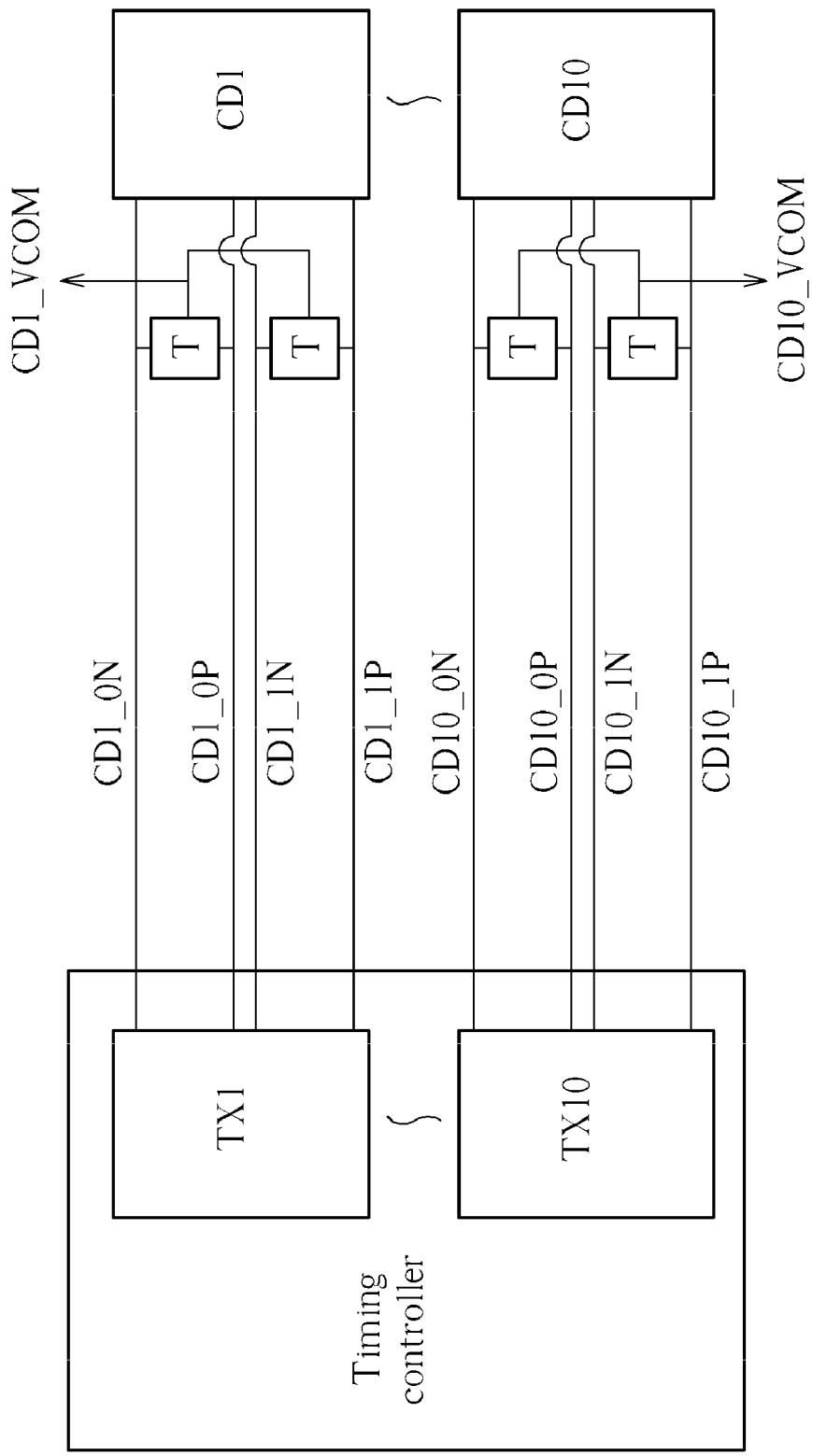
FIG. 3 is a schematic diagram of the connection between a timing controller and a source driver.
Figure 4:
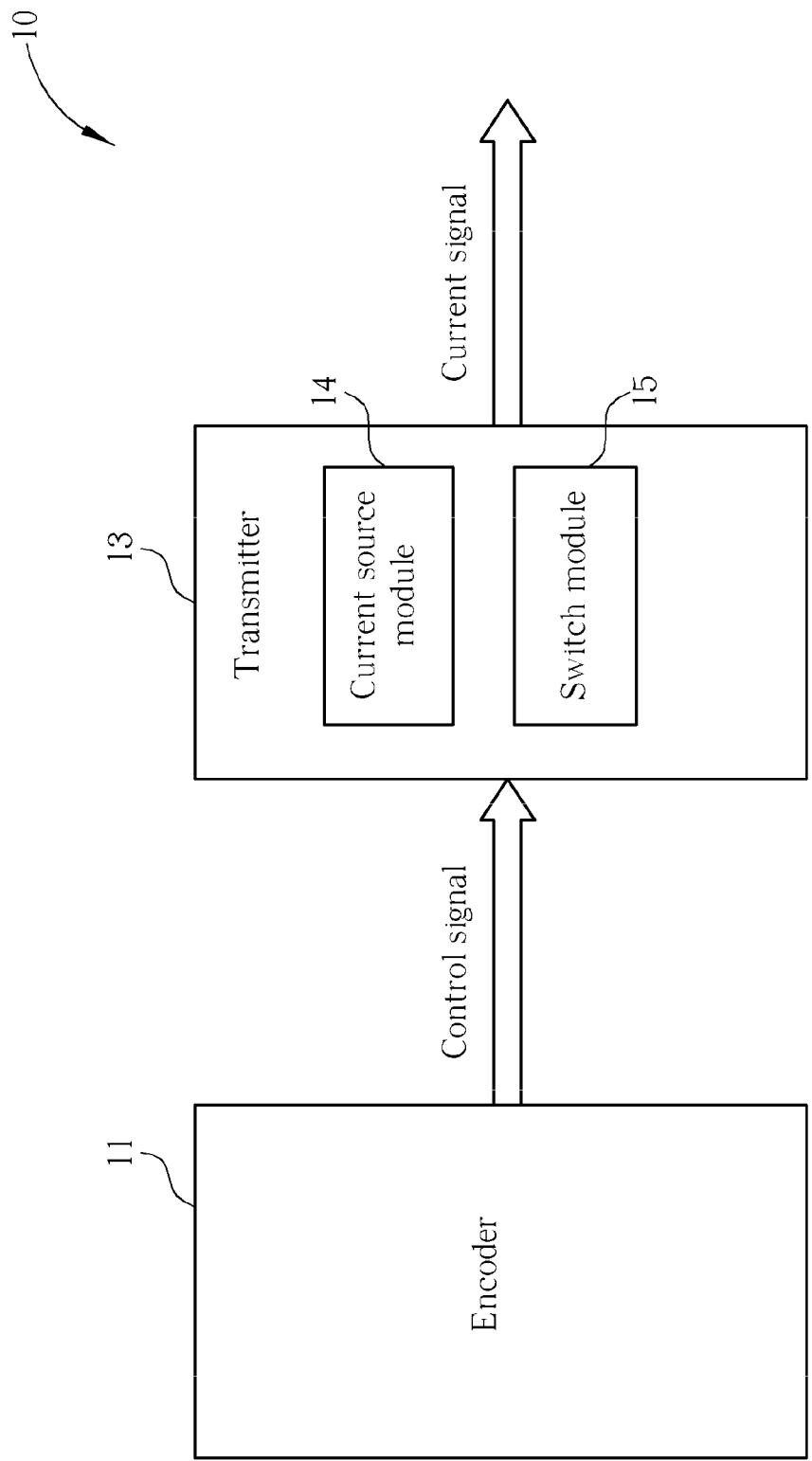
FIG. 4 is a system block of the transmission device according to the prior art.
Figure 5:
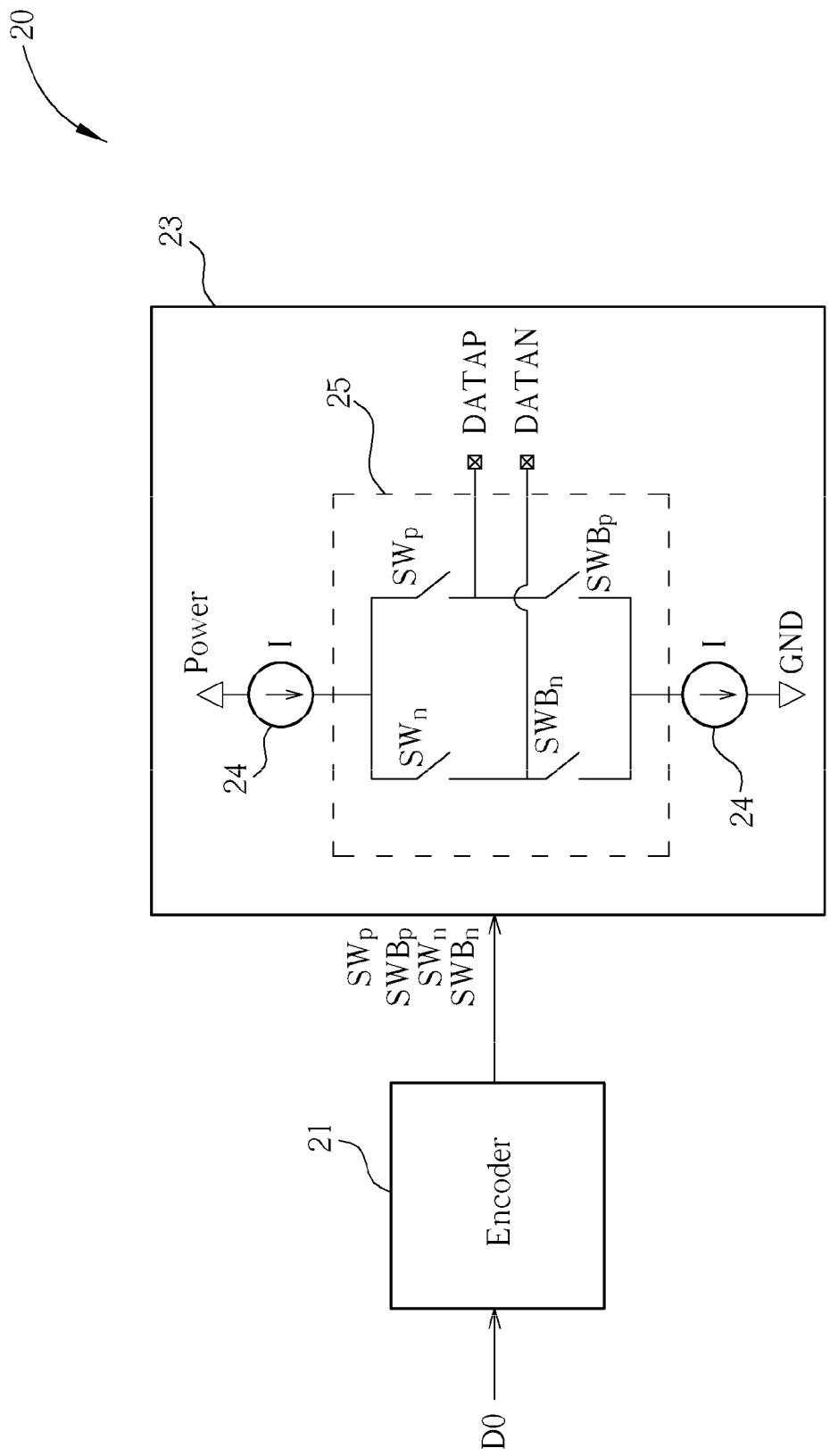
FIG. 5 is a circuitry of the two-level transmission device according to the prior art.
Figure 7:
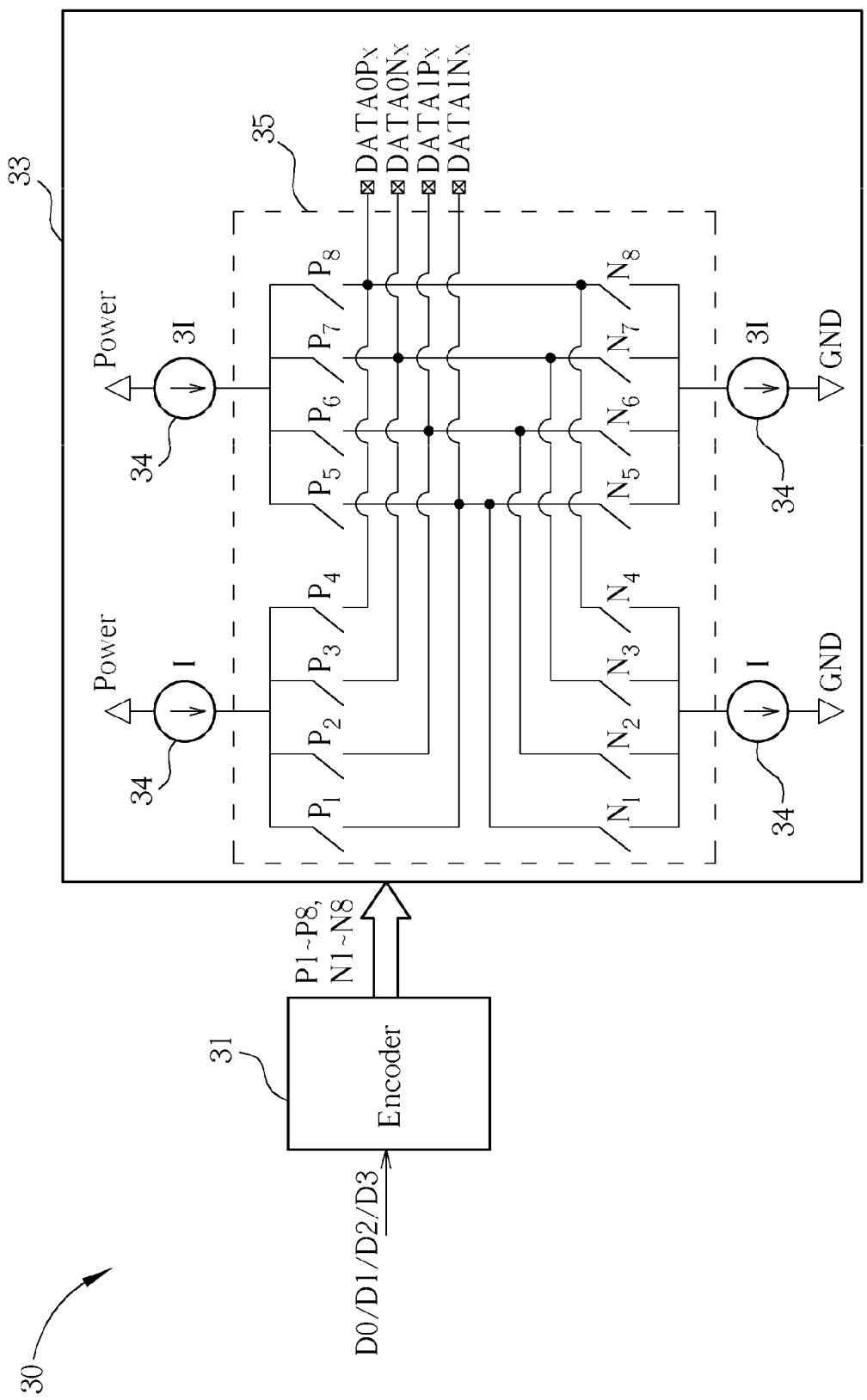
FIG. 7 is a circuitry of the four-level transmission device according to the prior art.
Figure 9:
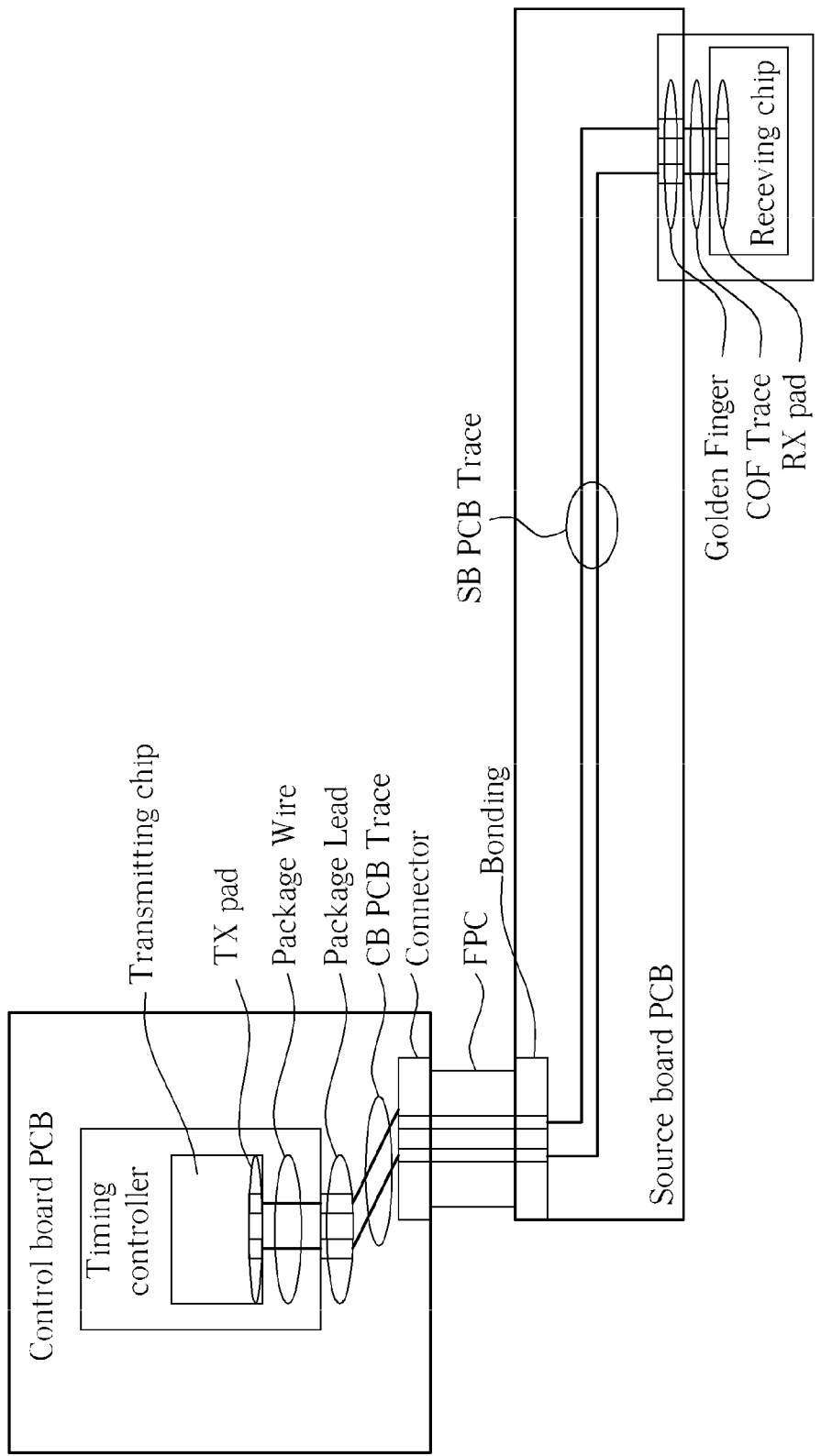
FIG. 9 is a schematic diagram of a display device.
Figure 10:
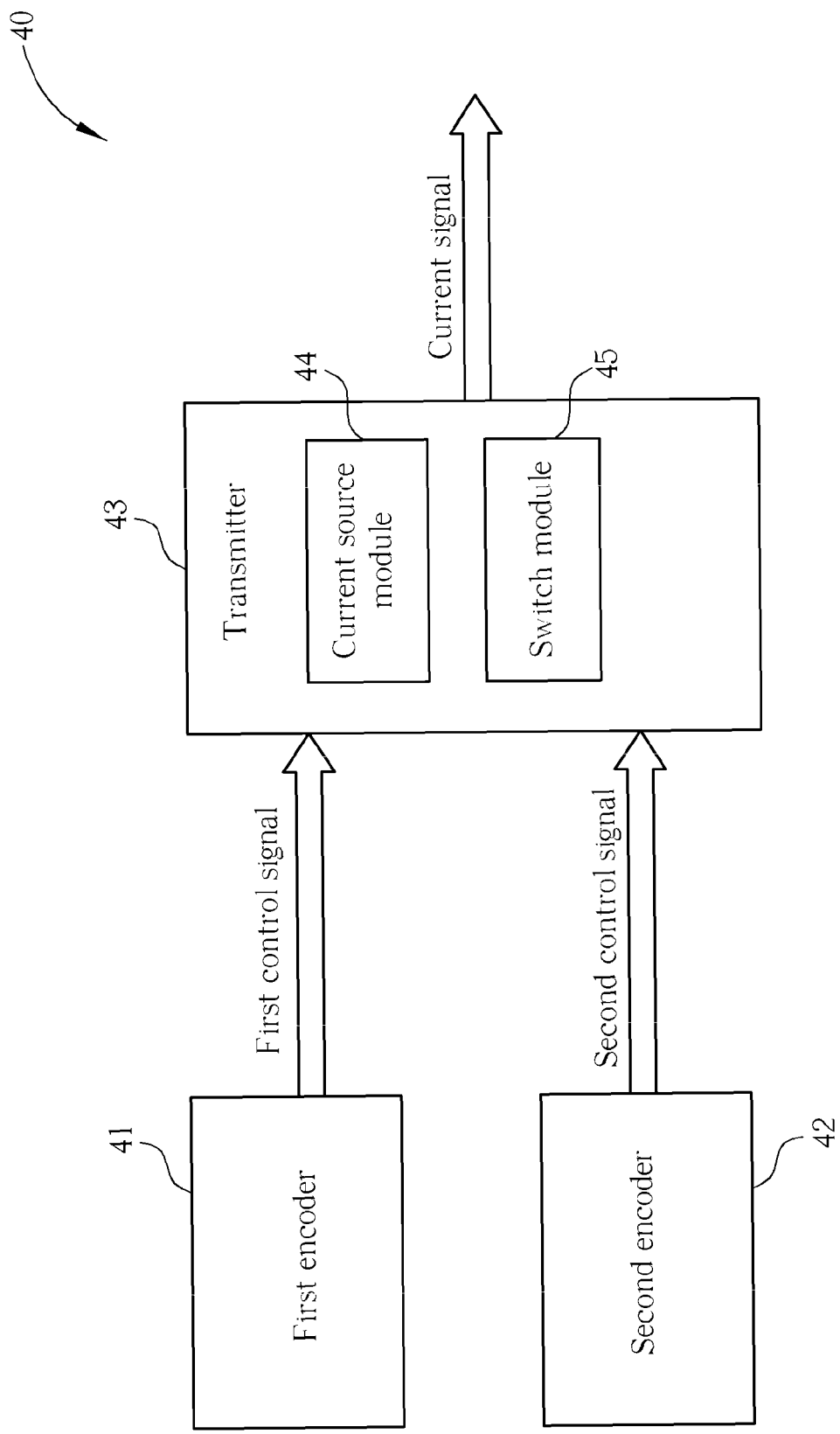
FIG. 10 is a system block of the transmission device according to the present invention.

Please refer to FIG. 10. FIG. 10 is a system block diagram of a transmission device according to the present invention. The transmission device 40 comprises a first encoder 41, a second encoder 42 and a transmitter 43. The transmitter 43 comprises a current source module 44 and a switch module 45. The first encoder 41 converts a display signal to a first control signal for controlling the switch module 45. The switch module 45 adjusts the value of the current signal outputted from the transmitter 43 according to the first control signal. The current source module 44 comprises a plurality of current sources and a plurality of current enhanced circuits. The second encoder 42 generates a second control signal according to the first control signal, so as to adjust the value of the current outputted from the current source module 44. The transmission device 40 of the present invention enhances the edge of the current signal when the current signal changes so as to increase the energy of the current signal. Thus, the current signal can have enough energy after the channel decay. The edge enhancement of the current signal adds an extra current to the original current variance. The extra current is the edge enhanced current, and the duration of the edge enhanced current can be adjusted according to the intensity of the current signal.

Figure 11:
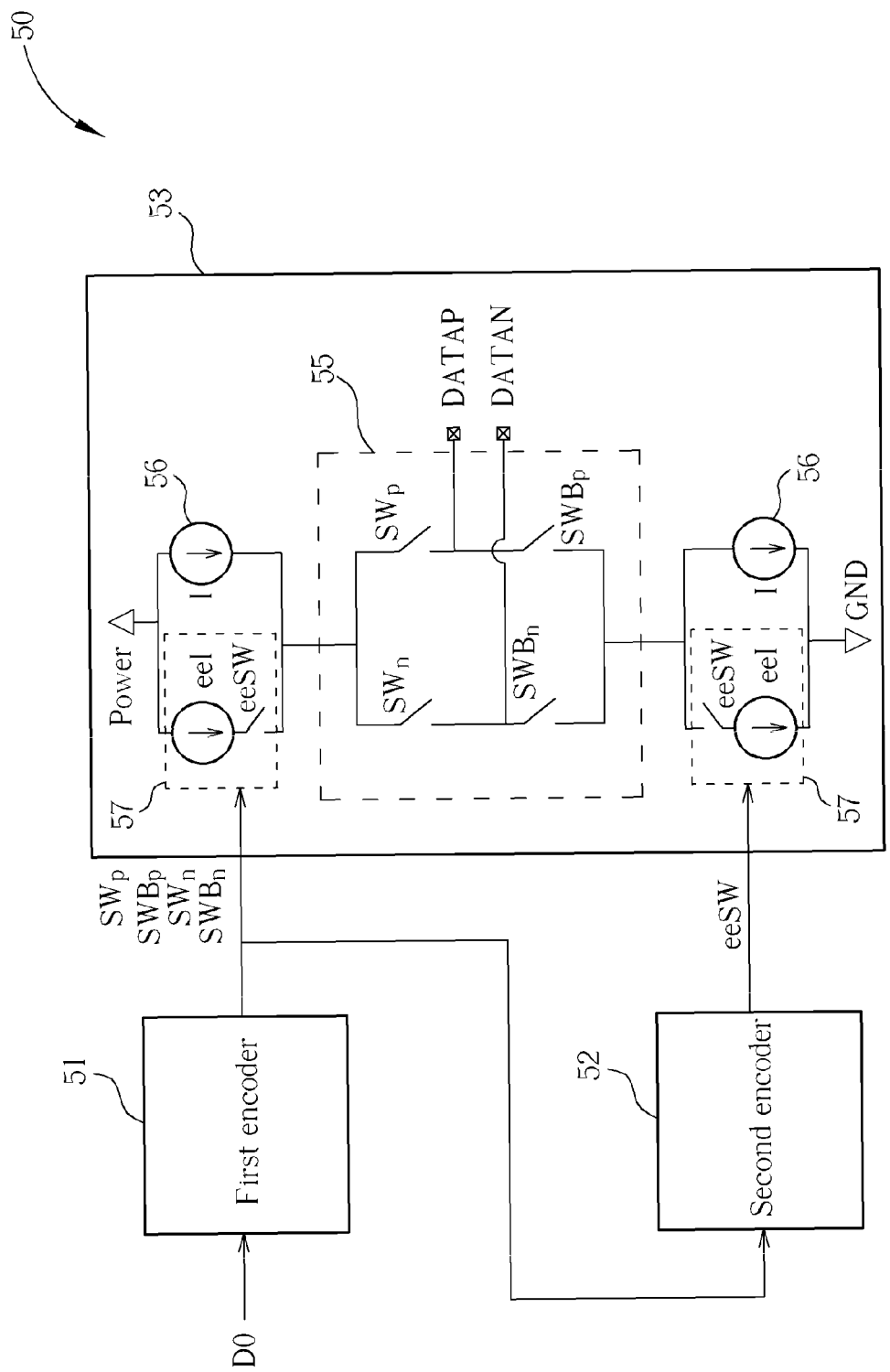
FIG. 11 is a circuitry of the first embodiment of the transmission device according to the present invention.
Figure 13:
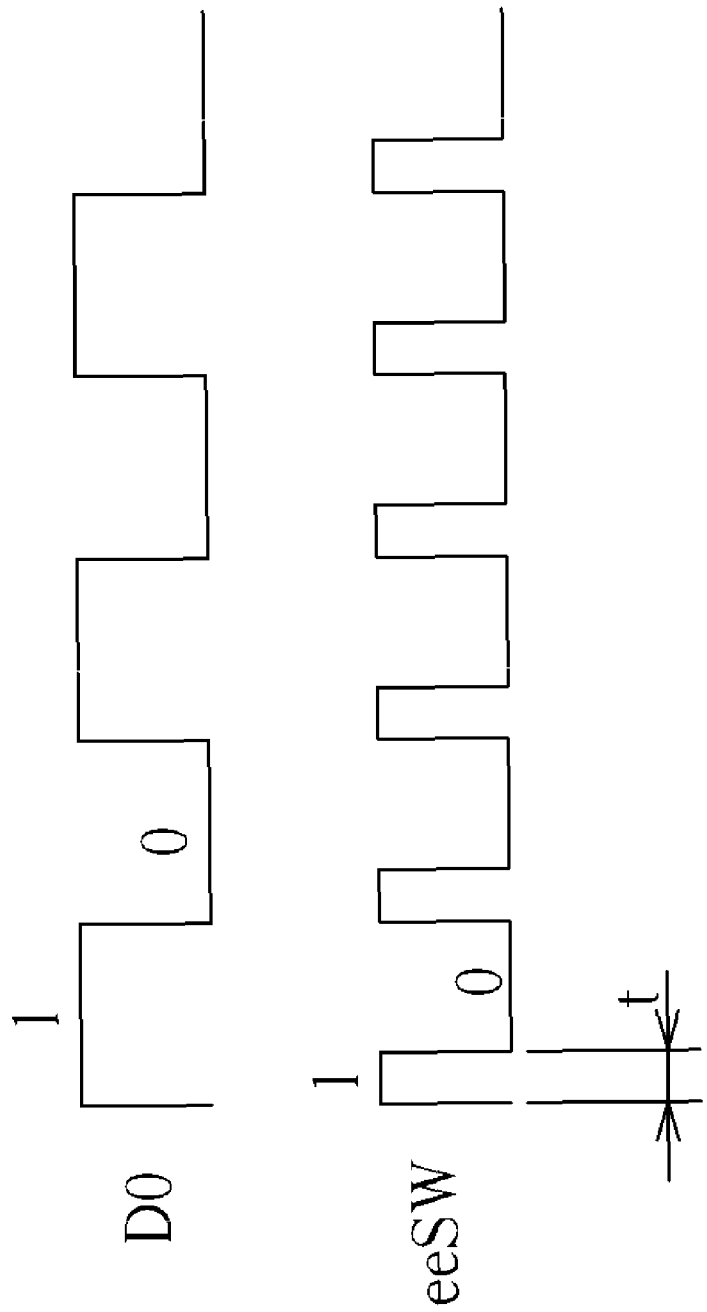
FIG. 13 is a waveform diagram of the control signal of the switch and the displaying signal.

Please refer to FIG. 11 to FIG. 13. FIG. 11 is a circuitry of a first embodiment of the transmission device according to the present invention. FIG. 12 is a truth table of the first encoder and the second encoder. FIG. 13 is a waveform diagram of the display signal D0 and the control signal of the switch eeSW. The transmission device 50 comprises a first encoder 51, a first encoder 52 and a transmitter 53. The first encoder 51 converts a display signal D0 to a first control signal (SWn/SWp/SWBn/SWBp). The second encoder 52 generates a second control signal eeSW according to the first control signal. The transmitter 53 comprises a switch module 55, a plurality of current sources 56 and a plurality of current enhanced circuits 57. A plurality of current sources 56 comprises a current source of a positive current +I and a negative current −I. The current enhanced circuit 57 comprises current sources and the switches of the current +eeI and −eeI. The switch module 55 comprises switches SWn, SWp, SWBn, and SWBp. The switches SWn, SWp, SWBn, and SWBp are controlled by the first control signal, and the switch eeSW is controlled by the second control signal, as the truth table shown in FIG. 12. The switch is turned on when the control signal is logic"1", and the switch is turned off when the control signal is logic"0". When the display signal D0 of duration N and the duration of N+1 are both logic"1", the switches SWp and SWBn are turned on for the duration N+1; it means that the current flowing to the signal line DATAP is +I and the current flowing to the signal line DATAN is −I. When the display signal D0 of duration N and the duration of N+1 are both logic"0", the switches SWBp and SWn are turned on for the duration N+1; it means that the current flowing to the signal line DATAP is −I and the current flowing to the signal line DATAN is +I. When the display signal D0 of the duration N is logic"1" and the displaying signal D0 of the duration N+1 is logic "0", the switches SWBp,SWn and eeSW are turned on for the duration N+1, but the switch eeSW is only turned on for the duration t; it means that the current flowing to the signal line DATAP is −I−eeI and the current flowing to the signal line DATAN is +I+eeI for the duration t. When the display signal D0 of the duration N is logic"0" and the display signal D0 of the duration N+1 is logic"1", the switches SWp,SWBn and eeSW are turned on for the duration N+1, but the switch eeSW is only turned on for the duration t; it means that the current flowing to the signal line DATAP is +I+eeI and the current flowing to the signal line DATAN is −I−eeI for the duration t. Please refer to FIG. 13 again. As shown in FIG. 13, the switch eeSW is turned on only for the predetermined duration t when the display signal D0 changes the state so as to enhance the edge of the current.

It should be noticed that the present invention enhances the edge of the signal current when the display signal D0 changes the state, so the encoder 52 not only can generate the second control signal (eeSW) according to the first control signal (SWn/SWp/SWBn/SWBp) but also can generate the second control signal (eeSW) directly according to the display signal D0. Any relative and similar methods are also comprised in the present invention.

Figure 14:
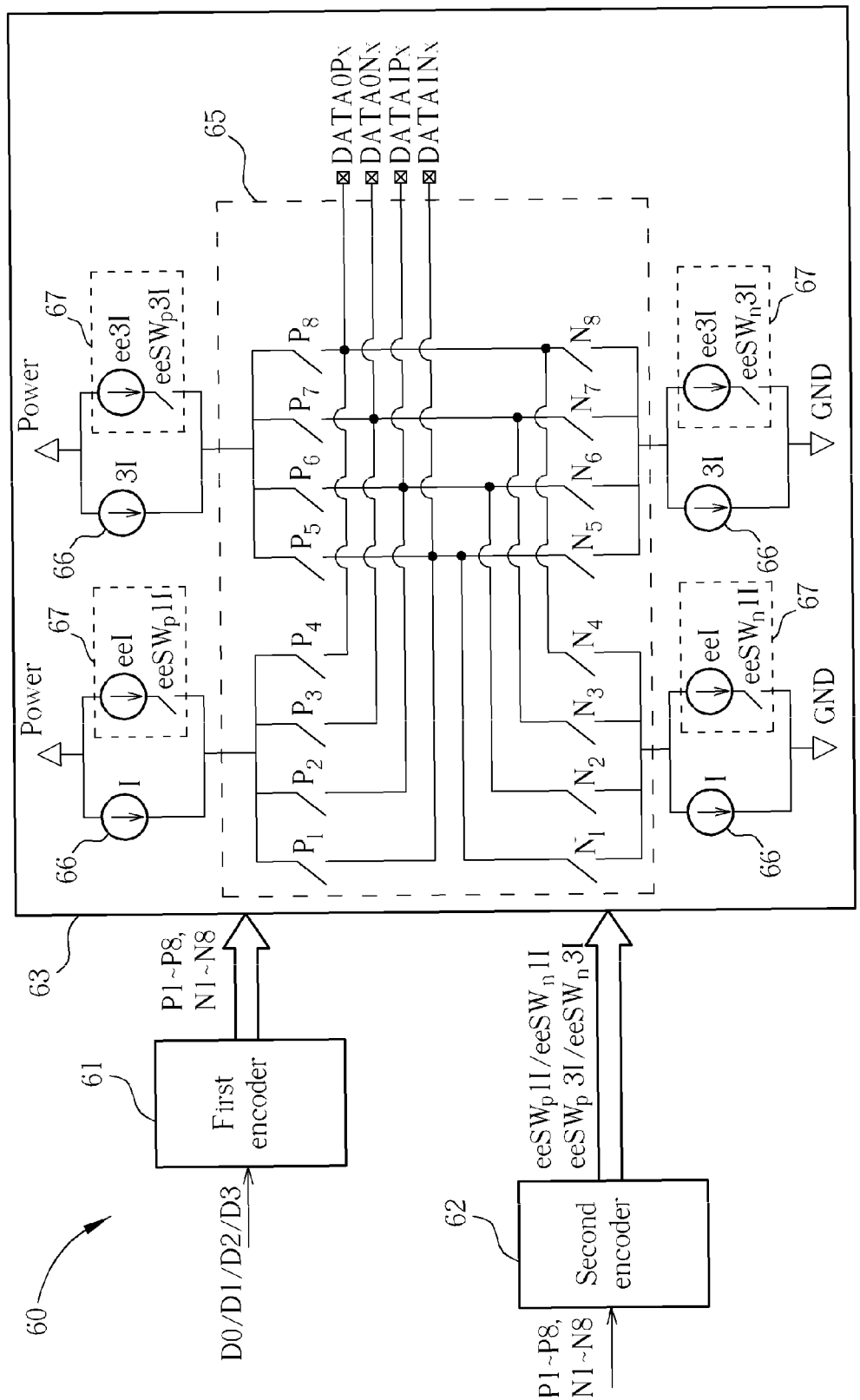
FIG. 14 is the circuitry of the second embodiment of the transmission device according to the present invention.
Figure 16:
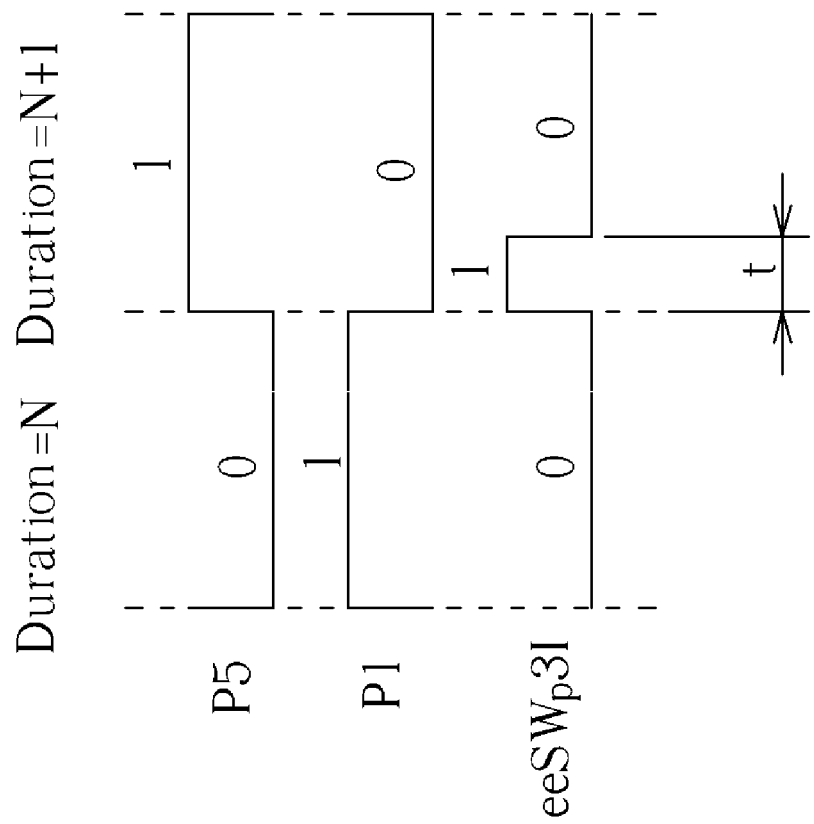
FIG. 16 is a waveform diagram of the control signal of switches.

Please refer to FIG. 14 to FIG. 16. FIG. 14 is a circuitry of a second embodiment of the transmission device according to the present invention. FIG. 15 is a truth table of the first encoder and the second encoder. FIG. 16 is a waveform diagram of the control signal of the switches P5, P1 and eeSWp3I. The transmission device 60 comprises a first encoder 61, a second encoder 62 and a transmitter 63. The transmitter 63 comprises a switch module 65, a plurality of current sources 66 and a plurality of current enhanced circuits 67. The first encoder 61 converts a display signal D0/D1/D2/D3 to a first control signal (P1~P8/N1~N8). The second encoder 62 generates a second control signal according to the first control signal (eeSWp1I/eeSWp3I/eeSWn1I/eeSWn3I). The method of generating the second control signal is to provide an extra current proportional to the current variance. For example, if the current of the signal line DATA0Px changes from −I to +I, it means that the current of the signal line DATA0Px changes from negative to positive, so the current variance is positive and a positive extra current (eeI) is provided. The transmitter 63 comprises a switch module 65, a plurality of current sources 66 and a plurality of current enhanced circuits 67. The plurality of current sources 66 comprises the current source of the current eeI and ee3I and the switch eeSWp1I, eeSWp3I, eeSWn1I, and eeSWn3I. The switch module 65 comprises switches P1~P8 and N1~N8. The switches P1~P8 and N1~N8 are controlled by the first control signal, and the switches eeSWp1I, eeSWp3I, eeSWn1I and eeSWn3I are controlled by the second control signal, as the truth table shown in FIG. 15. According to the truth table, the logic"1" of the control signal represents the switch being turned on, the control signal being logic"0" represents the switch being turned off, and the symbol "−" represents not existence. Px(N) represents Px=1 for the duration N. Nx(N) represents Nx=1 for the duration N, where x=1~8. Similarly, Px(N+1) and Nx(N+1) represent Px=1 and Nx=1 during the duration N+1 respectively. For example, (P1(N))&(P5(N+1)) represents P5=1 for the duration N, so the current of the signal line DATA1Nx is +3I, and P5=1 for the duration N+1, so the current of the signal line DATA1Nx is +3I. Since there is no current variance between the signal line DATA1Nx for the duration N and the duration N+1, the current enhanced circuit 46 (eeSWP31) of the current source +3I is not required to be turned on. Thus, the control signal of switch eeSWP31 for the duration N+1 is logic"0". (P1(N))&(P5(N+1)) represents P1=1 for the duration N with the current +I of the signal line DATA1Nx, and P5=1 for the duration N+1 with the current o+3I f the signal line DATA1Nx. The current variance between the duration N and the duration N+1 of the signal line DATA1Nx is +2I. Since the current variance is positive, the switch eeSWp31 is turned on for increasing the extra current +ee3I for the duration t, and the control signal of the switch eeSWp3I for the duration N+1 is 1(t). Other information of the truth table can be obtained in this way as well.

Similarly, the second encoder 62 can generate the second control signal (eeSWp1I/eeSWp3I/eeSWn1I/eeSWn3I) directly according to the display data (D0/D1/D2/D3) or according to the first control signal (P1~P8/N1~N8. Any relative and similar methods are also comprised in the present invention.

Figure 17:
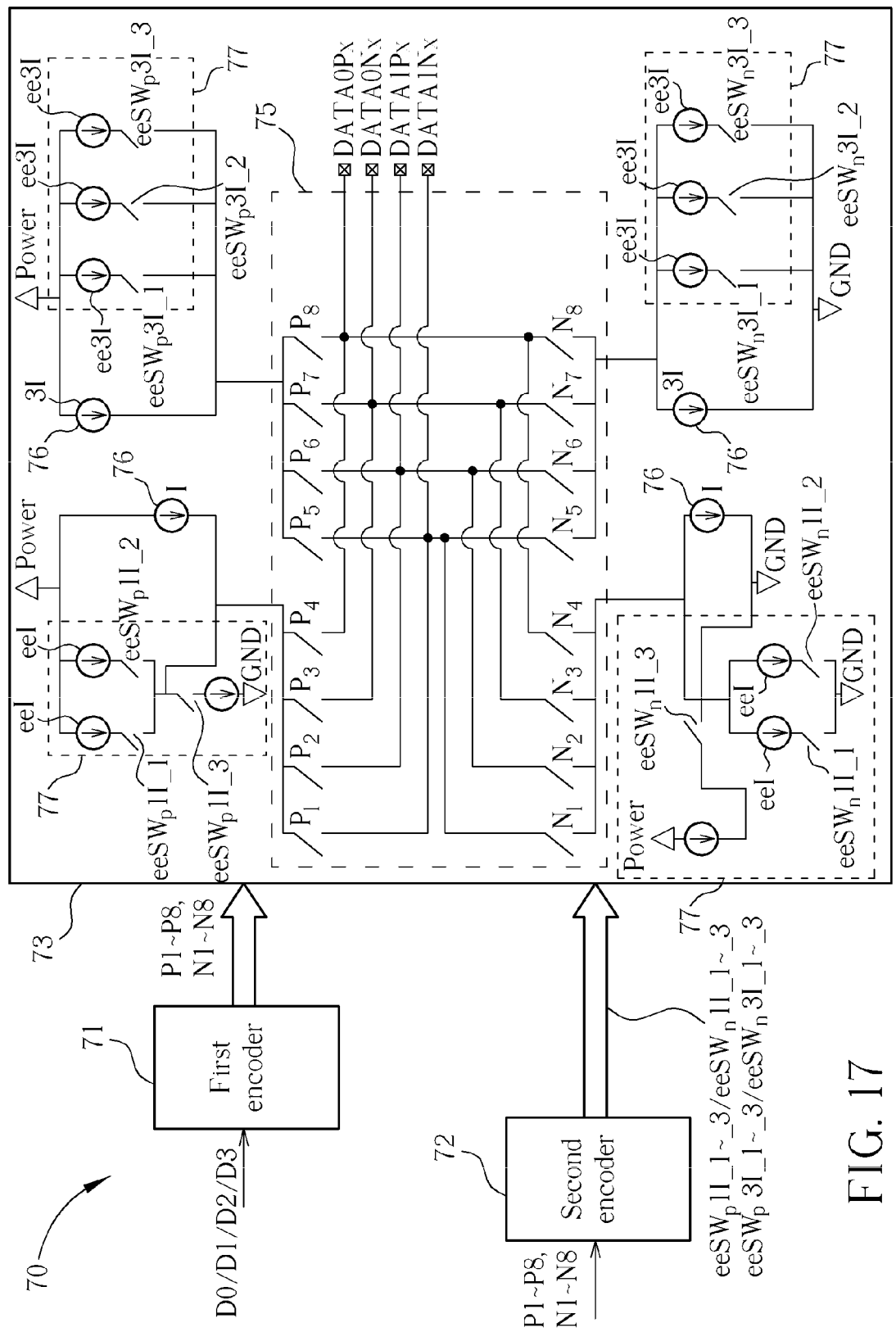
FIG. 17 is a circuitry of the third embodiment of the transmission device according to the present invention.
Figure 19:
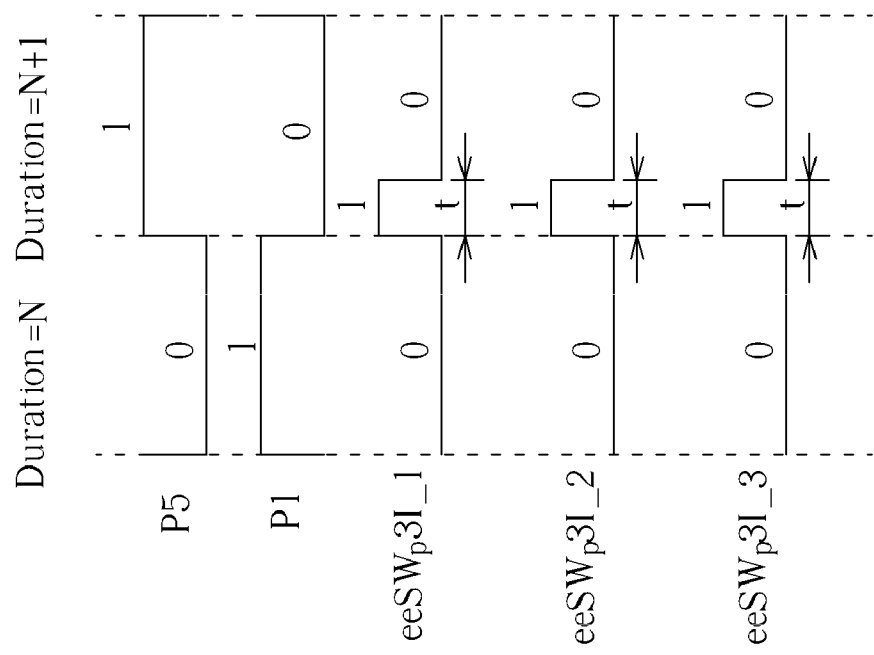
FIG. 19 is a waveform diagram of the control signal of switches.

Please refer to FIG. 17 to FIG. 19. FIG. 17 is a circuitry of a third embodiment of the transmission device according to the present invention. FIG. 18 is a truth table of the first encoder and the second encoder. FIG. 19 is a waveform diagram of the control signal of switches P5, N1, eeSWp3I_1, eeSWp3I_2 and eeSWp3I_3. The transmission device 70 comprises a first encoder 71, a first encoder 72, and a transmitter 73. The first encoder 71 converts a displaying signal D0/D1/D2/D3 to a first control signal (P1~P8/N1~N8). The second encoder 72 generates a second control signal (eeSWp1I_1~eeSWp1I_3/eeSWp3I_1~eeSWp3I_3/eeSWn1I_1~eeSWn1I_3/eeSWn3I_1~eeSWn3I_3) according to the first control signal. The transmitter 73 comprises a switch module 75, a plurality of current sources 76, and a plurality of the current enhanced circuits 77. The plurality of current sources 76 comprises current sources of the positive current +I and +3I and current sources of the negative current −I and −3I. The current enhanced circuit 77 comprises the current source of the current eeI and ee3I, and switches eeSWp1I_1~eeSWp1I_3, eeSWp3I_1~eeSWp3I_3, eeSWn1I_1~eeSWn1I_3, and eeSWn3I_1~eeSWn3I_3. The switch module 55 comprises switches P1~P8 and N1~N8. In the third embodiment, the extra current provided by the current enhanced circuit 77 relates to the current variance of the current signal. For example, the current of the signal line DATA0Px changes from −3I to +3I; that is, the current of the signal line DATA0Px changes from negative to positive with current variance of +6I, so the current enhanced circuit 77 can provide the extra current of 3*eeI. When the current of the signal line DATA0Px changes from −I to +3I with the current variance of +4I, the current enhanced circuit 77 can provide the extra current of 2*eeI. When the current of the signal line DATA0Px changes from +I to +3I with the current variance of +2I, the current enhanced circuit 77 can provide the extra current of 1*eeI. The aforementioned is only an embodiment. The relationship between the extra current provided by the current enhanced circuit 77 and the current variance of the output signal can be adjusted according to the channel effect. The switches P1~P8 and N1~N8 are controlled by the first control signal, the switches eeSWp1I_1~eeSWp1I_3, eeSWp3I_1~eeSWp3I_3, eeSWn1I_1~eeSWn1I_3, eeSWn3I_1~eeSWn3I_3 are controlled by the second control signal, as the truth table shown in FIG. 18. In the truth table, the symbol "−" represents not existence. Px(N) represents Px=1 for the duration N. Nx(N) represents Nx=1 for the duration N, where x=1~8. Similarly, Px(N+1) and Nx(N+1) represent Px=1 and Nx=1 of the duration N+1 respectively. For example, (P5(N))&(P5(N+1)) represents P5=1 for the duration N, so the current of the signal line DATA1Nx is +3I, and P5=1 for the duration N+1, so the current of the signal line DATA1Nx is also +3I. Since there is no current variance of the signal line DATA1Nx for the duration N and the duration N+1, the switches eeSWp3I_1, eeSWp3I_2, and eeSWp3I_3 of the current enhanced circuit 77 are not required to be turned on. Thus, the control signal of switches eeSWp3I_1, eeSWp3I_2 and eeSWp3I_3 for the duration N+1 is 0/0/0. (P1(N))&(P5(N+1)) represents P1=1 during the duration N, so the current of the signal line DATA1Nx is +I, and P5=1 for the duration N+1, so the current of the signal line DATA1Nx is +3I. Thus, the current variance of the signal line DATA1NX between the duration N and the duration N+1 is +2I, and the extra current of 1*eeI3I is provided for the duration t. The control signal of switches eeSWp3I_1, eeSWp3I_2, and eeSWp3I_3 for the duration N+1 is 1(t)/0/0. (N1(N))&(P5(N+1)) represents the current of the signal line DATA1Nx for the duration N is −I and for the duration N+1 is +3I. The current variance of the signal line DATA1Nx between the duration N and the duration N+1 is +4I, and the extra current of 2*ee3I is provided for the duration t. Thus, the control signal of switches eeSWp3I_1, eeSWp3I_2, and eeSWp3I_3 for the duration N+1 is 1(t)/1(t)/0. (N5(N))&(P5(N+1)) represents the current of the signal line DATA1Nx for the duration N is −3I and for the duration N+1 is +3I. The current variance of the signal line DATA1Nx between the duration N and the duration N+1 is +6I, and the extra current of 3*ee3I is provided for the duration t. Thus, the control signal of switches eeSWp3I_1, eeSWp3I_2 and eeSWp3I_3 for the duration N+1 is 1(t)/1(t)/1(t), as shown in FIG. 19.

Similarly, the second encoder 72 can generate the second control signal (eeSWp1I_1~eeSWp1I_3/eeSWp3I_1~eeSWp3I_3/eeSWn1I_1~eeSWn1I_3/eeSWn3I_1~eeSWn3I_3) directly according to the displaying data D0/D1/D2/D3 or according to the first control signal (P1~P8/N1~N8). Any relative and similar methods are also comprised in the present invention.

In conclusion, the transmission device for enhancing signals of the present invention comprises a first encoder, a plurality of the current sources, a switch module, a second encoder and a plurality of the current enhanced circuits. The first encoder converts an input signal to a first control signal. The switch module is coupled between the plurality of the current sources and the plurality of the signal lines. The switch module controls the connection between the plurality of the current sources and the plurality of the signal lines according to the first control signal, so as to generate a current signal. The second encoder converts the first control signal (or the display signal) to a second control signal. The plurality of the current enhanced circuits is coupled to the plurality of the current sources respectively. The plurality of the current enhanced circuits provide n extra current for a predetermined duration according to the second control signal, so as to enhance the current signal. Therefore, the transmission device of the present invention can enhance the current signal, so as to prevent the transmission signal from the channel effect.

Those skilled in the art will readily observe that numerous modifications and alterations of the device and method may be made while retaining the teachings of the invention.

What is claimed is:

1. A signal enhanced transmission device comprising:
a first encoder for converting an input signal to a first control signal;
a plurality of current sources;
a plurality of signal lines for transmitting a current signal;
a switch module coupled between the plurality of current sources and the plurality of signal lines, for controlling connection between the plurality of current sources and the plurality of signal lines according to the first control signal to determine the value of the current signal;
a second encoder for generating a second control signal according to the first control signal or the input signal; and
a plurality of current enhanced circuits coupled to the plurality of current sources respectively, for providing an extra current according to the second control signal to change the value of the current signal.

2. The signal enhanced transmission device of claim 1, wherein the plurality of current sources can provide the current of different values.

3. The signal enhanced transmission device of claim 2, wherein the plurality of current enhanced circuits provides corresponding extra currents according to the value of the current provided by the plurality of current sources.

4. The signal enhanced transmission device of claim 1, wherein each current enhanced circuits comprises:

an enhanced current source for providing the extra current; and
a switch coupling to the enhanced current source and controlled by the second control signal.

5. The signal enhanced transmission device of claim 4, wherein each current enhanced circuit further comprises a plurality of enhanced current sources and a plurality of switches for providing the extra current of different values.

6. The signal enhanced transmission device of claim 1, wherein the plurality of current enhanced circuits provides the extra current for a predetermined duration to enhances the current signal.

7. The signal enhanced transmission device of claim 1, wherein the plurality of current enhanced circuits can provide corresponding extra currents according to the current difference of the current signal.

8. A signal enhanced transmission device comprising:
a first encoder for converting an input signal to a first control signal;
a plurality of current sources;
a plurality of signal lines for transmitting a current signal;
a switch module coupled between the plurality of current sources and the plurality of signal lines, for controlling connection between the plurality of current sources and the plurality of signal lines according to the first control signal to determine the value of the current signal; and
a plurality of current enhanced circuits coupled to the plurality of current sources respectively, for providing an extra current when the current signal changes the state to increase current difference of the current signal.

9. The signal enhanced transmission device of claim 8 further comprising:
a second encoder for generating a second control signal according to the first control signal;
wherein the plurality of current enhanced circuits is coupled to the second encoder for increasing the current difference of the current signal when the current signal changes the state according to the second control signal.

10. The signal enhanced transmission device of claim 9, wherein each current enhanced circuit comprises:
an enhanced current source for providing an extra current; and
a switch coupling to the enhanced current source and controlled by the second control signal.

11. The signal enhanced transmission device of claim 8 further comprising:
a second encoder for generating a second control signal according to the input signal;
wherein the plurality of current enhanced circuits is coupled to the second encoder for increasing the current difference of the current signal when the current signal changes the state according to the second control signal.

12. The signal enhanced transmission device of claim 11, wherein each current enhanced circuit comprises:
a enhanced current source for providing the extra current; and
a switch coupling to the current enhanced circuit and controlled by the second control signal.

13. The signal enhanced transmission device of claim 8, wherein the plurality of current sources can provide the current of different values.

14. The signal enhanced transmission device of claim 11, wherein the plurality of current enhanced circuits provides corresponding extra currents according to the value of the current provided by the plurality of current sources.

15. The signal enhanced transmission device of claim 14, wherein each current enhanced circuit further comprises a plurality of enhanced current sources and a plurality of switches, so as to provide the extra current of different values.

16. The signal enhanced transmission device of claim 8, wherein the plurality of current enhanced circuits provides the extra current for a predetermined duration to enhances the current signal when the current signal changes the state.

17. The signal enhanced transmission device of claim 8, wherein the plurality of current enhanced circuits can provide extra currents of difference values according to the current difference of the current signal.

* * * * *